US012600232B2

(12) United States Patent
Mügge et al.

(10) Patent No.: US 12,600,232 B2
(45) Date of Patent: Apr. 14, 2026

(54) DISPLAY DEVICE FOR A VEHICLE

(71) Applicants: HELLA GmbH & Co. KGaA, Lippstadt (DE); AUDI AG, Ingolstadt (DE); Carl Zeiss Jena GmbH, Jena (DE)

(72) Inventors: Martin Mügge, Geseke (DE); Johannes Scheuchenpflug, Baar-Ebenhausen (DE); Christoph Erler, Jena (DE); Carsten Hohmann, Warstein (DE); Alfons Michaelis, Borchen (DE); Siemen Kuehl, Jena (DE); Petr Vojtisek, Jena (DE)

(73) Assignees: HELLA GmbH & Co. KGaA, Lippstadt (DE); AUDI AG, Ingolstadt (DE); Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 18/891,150

(22) Filed: Sep. 20, 2024

(65) Prior Publication Data

US 2025/0010716 A1      Jan. 9, 2025

Related U.S. Application Data

(63) Continuation of application No. PCT/EP2023/053842, filed on Feb. 16, 2023.

(30) Foreign Application Priority Data

Mar. 21, 2022     (DE) ..................... 10 2022 106 488.3

(51) Int. Cl.
*B60K 35/21*          (2024.01)
*B60K 35/22*          (2024.01)
(Continued)

(52) U.S. Cl.
CPC ............ *B60K 35/211* (2024.01); *B60K 35/22* (2024.01); *B60K 35/50* (2024.01); *B60K 35/60* (2024.01);
(Continued)

(58) Field of Classification Search
CPC ...... B60K 35/211; B60K 35/22; B60K 35/50; B60K 35/60; B60K 35/81; B60K 35/90;
(Continued)

(56) References Cited

U.S. PATENT DOCUMENTS 9,823,403 B2 * 11/2017 Ohno ..................... G02B 6/002
10,072,813 B2 * 9/2018 Koizumi ............... F21S 43/249
(Continued)

FOREIGN PATENT DOCUMENTS

DE          19927712 A1       6/2000
DE       102004046256 A1       4/2006
(Continued)

OTHER PUBLICATIONS

International Search Report in PCT/EP2023/053842, mailed Jul. 12, 2023, 5 pages.

*Primary Examiner* — Tsion Tumebo
(74) *Attorney, Agent, or Firm* — Edell, Shapiro & Finnan, LLC

(57) ABSTRACT

A display device for the interior of a vehicle comprises light sources, light guides, and holograms. The light guides are arranged next to one another and each has an entrance surface and a reflective area. Each light source emanates light that enters the entrance surface of an associated light. At least one of the holograms is arranged at or in each light guide. The light emanated by each light source enters the entrance surface of the associated light guide in a direction of the reflective area of the associated light guide, is reflected by the reflective area of the associated light guide
(Continued)

in a direction of the hologram of the associated light guide, and interacts with the hologram of the associated light guide.

14 Claims, 8 Drawing Sheets

(51) Int. Cl.
| | |
|---|---|
| *B60K 35/50* | (2024.01) |
| *B60K 35/60* | (2024.01) |
| *B60K 35/81* | (2024.01) |
| *B60K 35/90* | (2024.01) |

(52) U.S. Cl.
CPC .............. *B60K 35/81* (2024.01); *B60K 35/90* (2024.01); *B60K 2360/178* (2024.01); *B60K 2360/23* (2024.01); *B60K 2360/29* (2024.01); *B60K 2360/31* (2024.01); *B60K 2360/336* (2024.01)

(58) Field of Classification Search
CPC .......... B60K 2360/178; B60K 2360/23; B60K 2360/29; B60K 2360/31; B60K 2360/336; B60K 2360/332; B60K 2360/691; B60K 2360/96; G03H 2001/2226; G03H 2001/2236; G03H 2001/2273; G03H 2001/2615; G03H 2001/266; G03H 2222/34; G03H 2223/16; G03H 1/2202; G02B 6/0018; G02B 6/002; G02B 6/0045; G02B 6/0078; G02B 30/50; G02B 5/32
See application file for complete search history.

(56) References Cited

U.S. PATENT DOCUMENTS

| | | | | |
|---|---|---|---|---|
| 2006/0239006 A1* | 10/2006 | Chaves | .................... | F21S 41/16 |
| | | | | 257/E33.071 |
| 2013/0114293 A1* | 5/2013 | Morino | .................. | G02B 6/002 |
| | | | | 362/608 |
| 2014/0036526 A1* | 2/2014 | Sato | ...................... | F21S 41/322 |
| | | | | 362/518 |
| 2015/0268399 A1* | 9/2015 | Futterer | ............... | G02B 6/0076 |
| | | | | 362/606 |
| 2016/0230950 A1* | 8/2016 | Hohmann | ............. | F21S 43/239 |
| 2020/0062192 A1* | 2/2020 | Ishibashi | ................ | B60K 35/53 |
| 2020/0240610 A1* | 7/2020 | Thomae | ................ | F21S 43/236 |
| 2021/0108776 A1* | 4/2021 | Kamau | ................ | G03H 1/2202 |
| 2021/0318658 A1* | 10/2021 | Shirakura | .............. | G09F 13/16 |
| 2023/0228398 A1* | 7/2023 | Muegge | ................ | F21S 43/239 |
| | | | | 362/511 |

FOREIGN PATENT DOCUMENTS

| | | | | |
|---|---|---|---|---|
| DE | 102017206882 A1 | 10/2018 | | |
| DE | 102017109314 A1 | 11/2018 | | |
| DE | 102017124296 A1 | 4/2019 | | |
| DE | 102021116880 B3 * | 9/2022 | .......... | G03H 1/2202 |
| EP | 0584545 A1 | 3/1994 | | |
| JP | H11287993 A | 10/1999 | | |
| WO | 2022/157082 A1 | 7/2022 | | |
| WO | 2023/088716 A1 | 5/2023 | | |

* cited by examiner

Fig. 1
Fig. 2
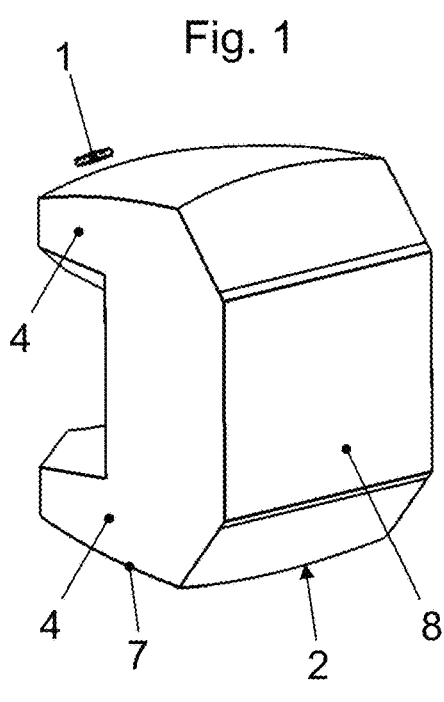
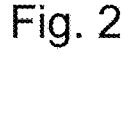
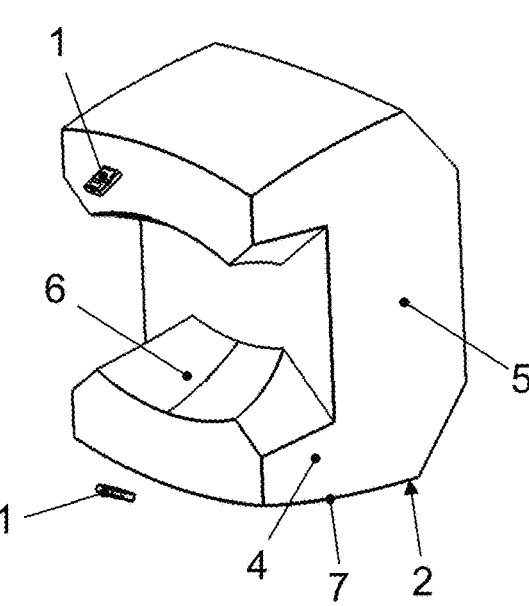
Fig. 3
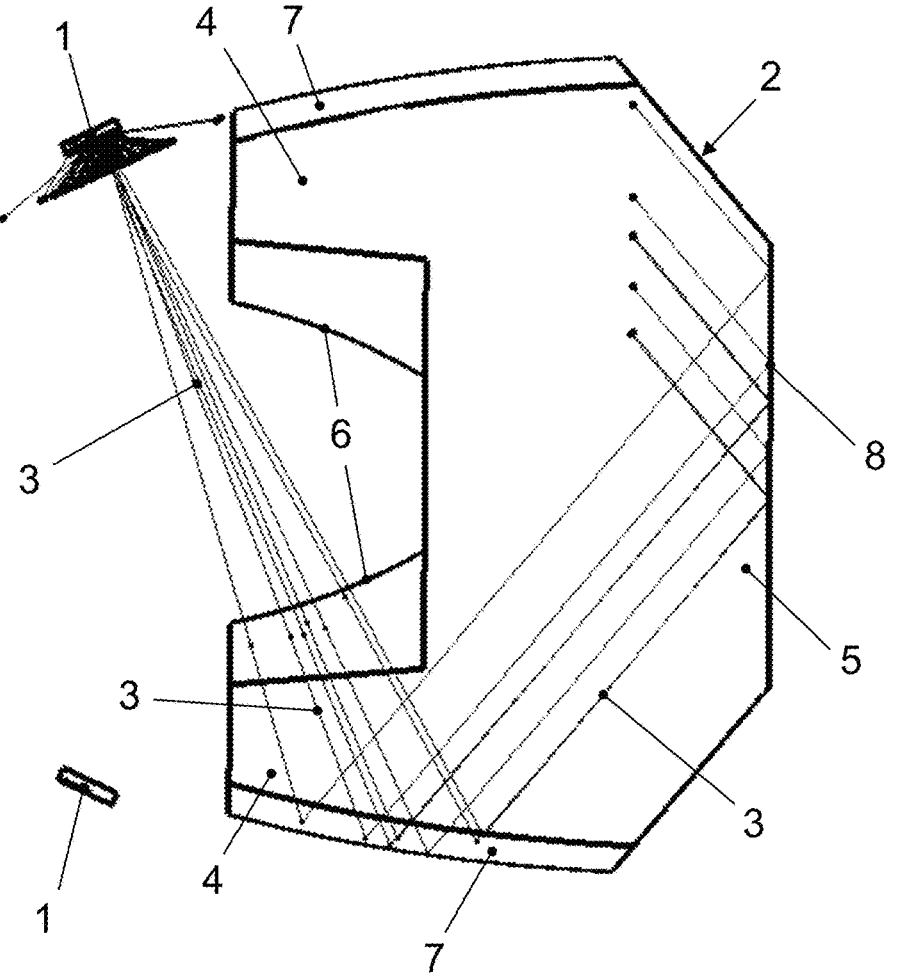

DISPLAY DEVICE FOR A VEHICLE

CROSS REFERENCE TO RELATED APPLICATIONS

This application is a continuation of International Application No. PCT/EP2023/053842, filed on Feb. 16, 2023, which claims priority under 35 U.S.C. § 119(a)-(d) to German patent application No. 10 2022 106 488.3, filed on Mar. 21, 2022, the entire contents of which are hereby incorporated by reference.

TECHNICAL FIELD

The present disclosure relates to a display device for a vehicle, which is configured to be integrated into the interior of the vehicle.

BACKGROUND

There are display devices that serve as warning lights in the interior of a vehicle, for example as the lane change assistant function or the blind spot warning function. If an overtaking vehicle is detected in the rear blind spot, which the driver cannot see via the side mirror, a small warning light lights up in or at the outside mirror or inside the mirror base or the front corner of the side window. A comparable function is then also used, for example, when the vehicle itself is changing lanes, possibly unintentionally, as a lane change assistant or lane assistant.

Holographic lighting systems can enhance and configure such a warning function and create scenarios with impressive depth and 3D appearance, with the advantage of offering greater attention and thus increased safety than today's small illuminated areas, which, possibly, can easily be overlooked.

It is desirable to integrate holograms into lighting systems or display devices of the vehicle interior with the aim of developing existing, simple warning lights or indicator lights into display devices with a three-dimensional illuminated image. This increases attention and recognizability and thus increases driving safety. In addition, holographic display functions provide a basis for the trend towards individualization and personalization, as the hologram can be individually configured with different, adapted graphics and representations. This makes it very easy to provide different appearances while retaining the optical components, which cannot be achieved without holograms, for example in order to be able to easily utilize cultural, country-specific graphics and pictograms or fonts in different ways and thus to individually adapt the design of the display function to global requirements.

The installation of display devices in paneling elements of the vehicle interior is characterized by tight installation spaces and a shallow installation depth because other components, such as cable harnesses, absorption components, loudspeakers, airbag feed lines or the airbags themselves, are often installed in the paneling. Another reason for tight installation spaces and a shallow installation depth can be a correspondingly strongly shaped body structure or supporting structure, which is embodied with several sheets or components in order to ensure the rigidity of the passenger compartment and to ensure occupant protection in the event of a crash.

A display device of the type mentioned above is known from DE 10 2019 206 025 A1. The display device described therein is used to display image information in the interior of a vehicle. The display device comprises a light source in the form of a light-emitting diode (LED) and a flat light guide, into the end face of which the light from the light source is coupled. The coupled light is totally reflected several times between the front and rear interfaces of the light guide and thus guided through the entire light guide surface. Several holograms are arranged in the light guide approximately in the middle between the front and rear interfaces, which are formed as reflection holograms. The interaction of the light with the holograms creates several holographic images that can be perceived by a user located in the interior of the vehicle. It is possible that with such flat systems the multiple light reflections at the front and rear interfaces are visible as images of alternating light and dark stripes in the reconstructed hologram. Furthermore, in such systems, the angle at which the light is reflected at the front and rear interfaces must correspond to the illumination angle of the hologram, which involves relatively great effort.

The problem underlying the present disclosure is to create a display device of the type mentioned above which has a simple structure and/or requires little installation space.

SUMMARY

It is provided that a display device comprises a plurality of light sources, a plurality of light guides, each having an entrance surface and a reflective area, wherein the light guides are arranged next to one another, and a plurality of holograms, wherein at least one of the holograms is arranged at or in each one of the light guides, wherein at least one of the light sources is associated with one of the light guides in each case and the display device is configured to the effect that light emanating from the light sources enters the entrance surface of the associated light guide in the direction of the reflective area in each case, is reflected by the reflective area inside the light guide in the direction of the hologram, and interacts with the hologram. As a result, the structure of the display device can be very compact. In particular, the light is reflected directly from the reflective area in the direction of the hologram, so that multiple reflections and light and dark stripes possibly associated with them in the reconstructed hologram are avoided. It can be provided that the direction in which the light guides are arranged next to one another is a horizontal direction or a vertical direction when the display device is installed in the vehicle. This is to say, the light guides can also be arranged one above the other.

It can be provided that the average distance between each of the light sources and the reflective area of the associated light guide is at least half the size of the average distance from the reflective area to the hologram, in particular wherein the average distance between the light source and the entrance surface together with the average distance between the entrance surface and the reflective area is between 0.8 and 1.2 times the size of the average distance between the reflective area and the hologram. In this case, the average distance between the entrance surface and the reflective area can be at least half the size of the average distance from the reflective area to the hologram, and/or the average distance between the light source and the entrance surface of the associated light guide can be at least half the size of the average distance between the reflective area and the hologram. The large distance between the light source and the reflective area results in a long distance over which the light emanating from the light source can expand in a transverse direction. This allows for a large width extension as well as a space-saving, compact design of the light guides, so that the display device can be easily integrated even in small installation spaces.

In this case, the display device can be formed so compactly that it is suitable for installation in different positions in the vehicle interior, for example integrated in the A-pillar, B-pillar or C-pillar or in the dashboard or in the center console or in the roof console or in the doors or at any other location in the vehicle interior.

It is possible for two light sources to be associated with each of the light guides and for each of the light guides to have two entrance surfaces and two reflective areas, the display device being configured so that light emanating from the first of the two light sources enters the first of the two entrance surfaces of the light guide in the direction of the first of the reflective areas, is reflected by the first reflective area inside the light guide in the direction of the hologram, and interacts with the hologram, and so that light emanating from the second of the two light sources enters the second of the two entrance surfaces of the light guide in the direction of the second of the reflective areas, is reflected by the second reflective area inside the light guide in the direction of the hologram, and interacts with the hologram. This means that despite the compact dimensions of the display device or the light guides, the hologram can be illuminated from two directions, for example by providing opposite light sources which, in cross-over fashion, introduce light into the entrance surface opposite the light source in each case.

It can be provided that two holograms are arranged at each of the light guides, in particular wherein the display device is configured to the effect that a first of the two holograms interacts with the light emanating from the first light source, and that the second of the two holograms interacts with the light emanating from the second light source. As a result, two different holographic images can be generated by one light guide.

Furthermore, it can be provided that the light emanating from the first light source has a different wavelength distribution, in particular a different color, than the light emanating from the second light source. This means that the light guide can be utilized for two different light colors, for example red and yellow or red and blue or red and green, in order to display two functions or different warnings and instructions by one hologram for each of the light colors.

It is possible for each of the light guides is designed to be U-shaped with two legs and a connecting area between the two legs. This creates a compact component that can be easily installed in the interior of a vehicle.

In this case, the first entrance surface and in particular also the first reflective area can be arranged on the first of the two legs, the second entrance surface and in particular also the second reflective area can be arranged on the second of the two legs, and the hologram or holograms can be arranged at or in the connecting area. This makes it possible to realize a very compact configuration of the display device.

It can be provided that the first light source is arranged at the second leg or in the area of the second leg and the second light source is arranged at the first leg or in the area of the first leg, wherein the display device in particular comprises a holder for the light sources or a holder for each one of the light sources in each case. As a result, the hologram or holograms is/are illuminated from two different directions, wherein the light sources, which, for example, are opposite one another, in cross-over fashion introduce light into the entrance surface opposite the light source. This results in two folded beam paths which contribute to the compactness of the display device.

It is possible that the display device is configured to the effect that an image composed of several individual holographic images is generated by the interaction of the light with the holograms arranged at or in the individual light guides. This increases the area for a holographic display.

It can be provided that the display device is configured to control the plurality of light sources such that the individual holographic images generated by the interaction of the light with the holograms arranged at or in the individual light guides are generated at different times, in particular in order to generate a dynamic or animated composite image. For example, when activating and/or deactivating the display function, the plurality of light sources can be controlled sequentially, thereby introducing a dynamic or animation into the holographic display, which increases attention and further increases safety. For example, this can also provide a warning for the driver in a hazard gradation.

It is possible for the display device to comprise a holding device at or in which the plurality of light sources and the plurality of light guides with the plurality of holograms are held. A common holding device simplifies the adjustment of the individual parts relative to one another.

It can be provided that the holding device comprises at least one light shading element in order to at least partially prevent undesired light entry into the plurality of light guides, wherein the at least one light shading element is preferably arranged in a connecting area between individual light guides and/or extends from a connecting area between individual light guides. This can in particular reduce the occurrence of double images or blurring in adjacent holographic images.

It is possible for the display device to comprise a housing and/or at least one cover plate and/or at least one design panel. This can be a common cover plate for all of the light guides. A design panel can also be provided that surrounds the light exit surfaces of the light guides.

It can be provided that the display device is configured to be integrated into an A-pillar or a B-pillar or a C-pillar or a dashboard or a center console or a roof console or a door of the interior of the vehicle.

BRIEF DESCRIPTION OF THE DRAWINGS

The disclosure is explained in more detail below with reference to the accompanying drawings.

FIG. 1 shows a perspective view of a part of a display device according to the disclosure, of which only a light guide and the associated light sources are shown.

FIG. 2 shows a further perspective view of the part of the display device according to FIG. 1.

FIG. 3 shows a sectional view of the part of the display device according to FIG. 1 with an exemplary beam path of the light emanating from one of the light sources.

DETAILED DESCRIPTION

Figure 4:
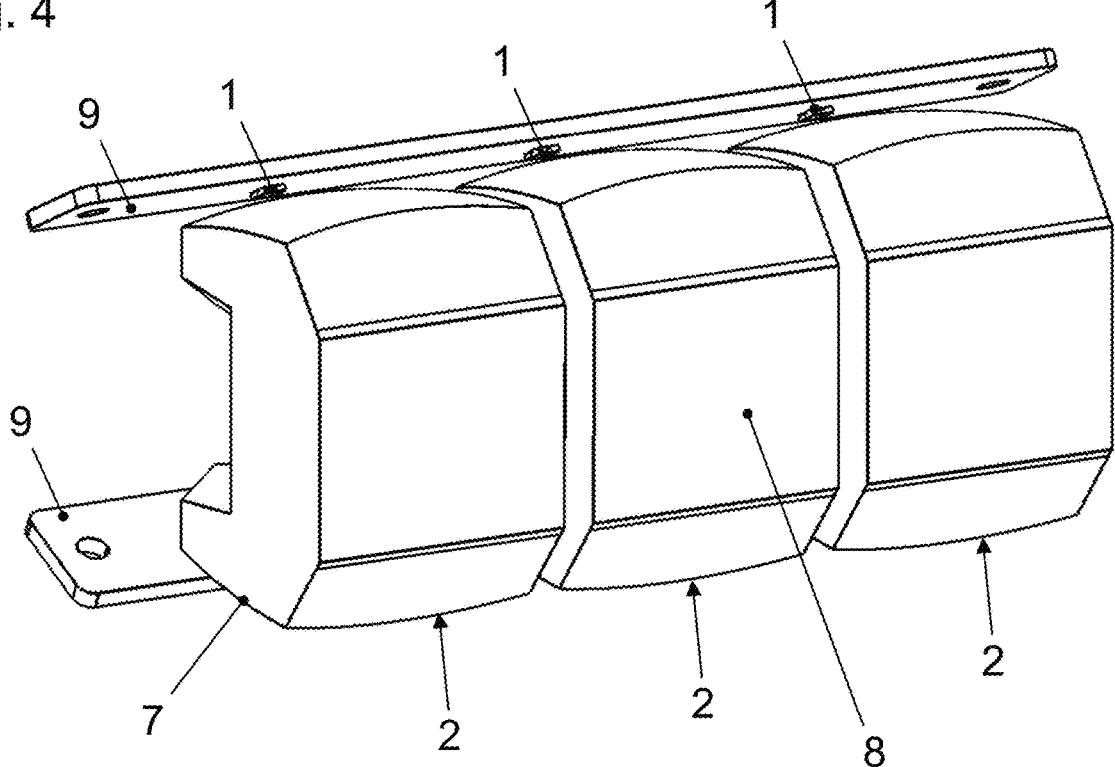
FIG. 4 shows a perspective view of the display device, showing several light guides and the associated light sources.
Figure 5:
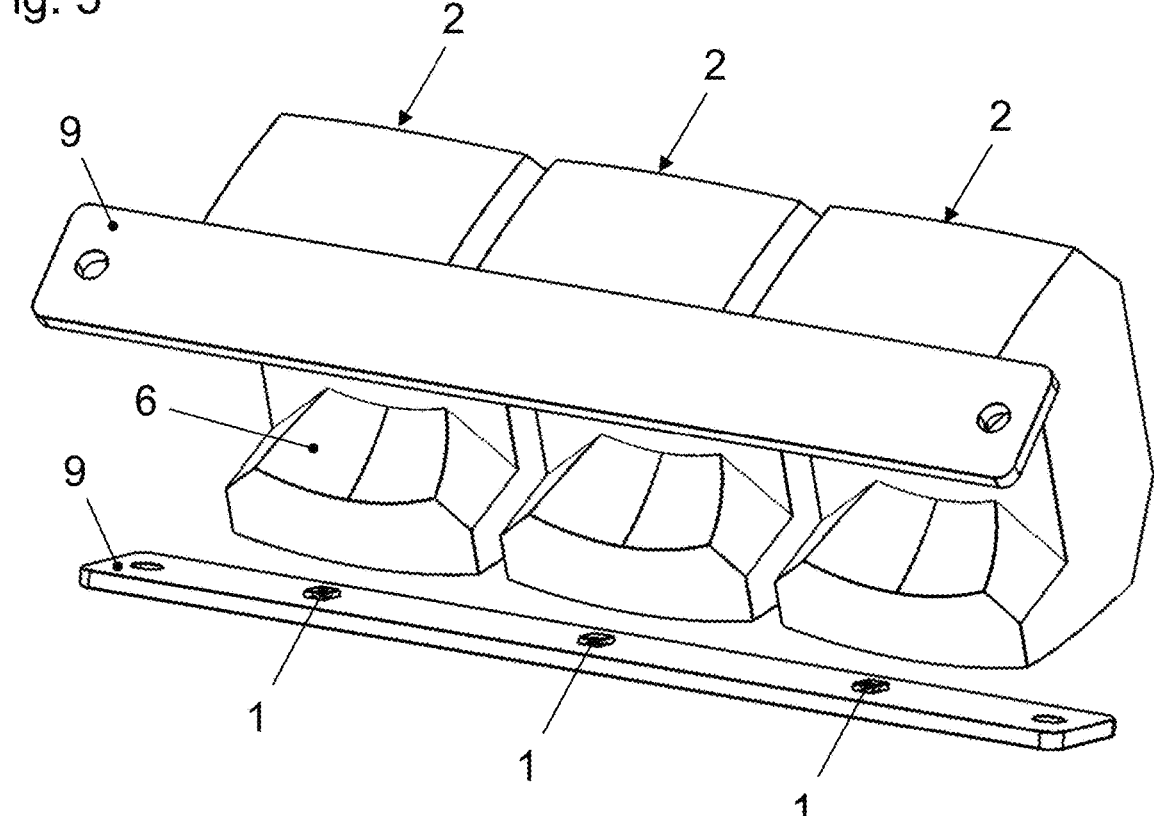
FIG. 5 shows a further perspective view of the display device according to FIG. 4.
Figure 6:
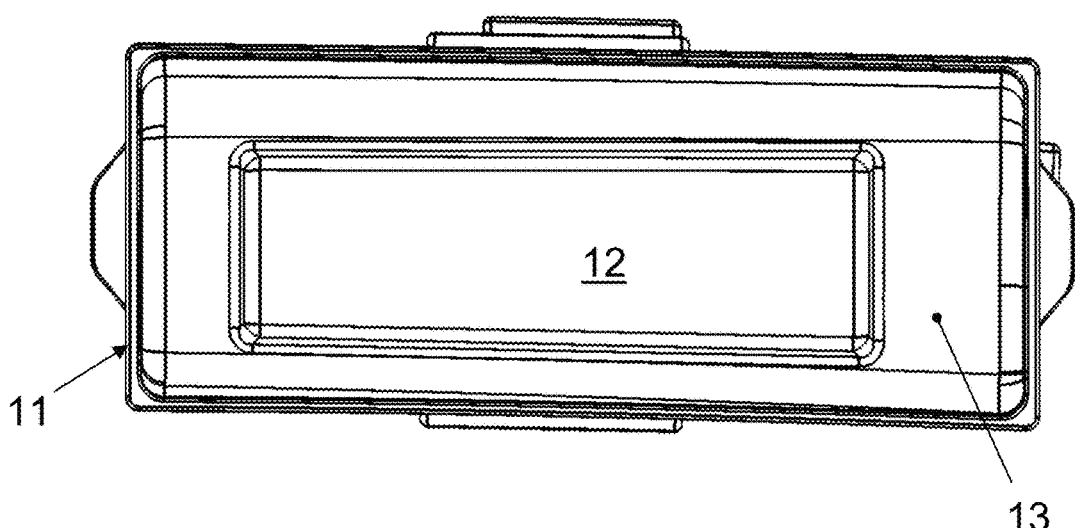
FIG. 6 shows a front view of the display device according to FIG. 4 with a housing.
Figure 7:
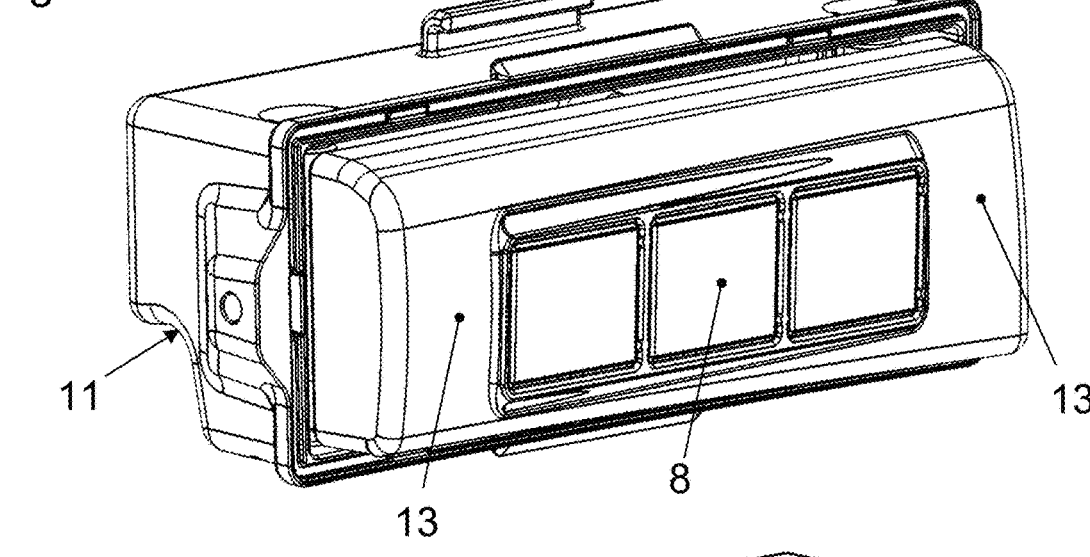
FIG. 7 shows a perspective view of the display device according to FIG. 4 with the housing without cover plate.
Figure 8:
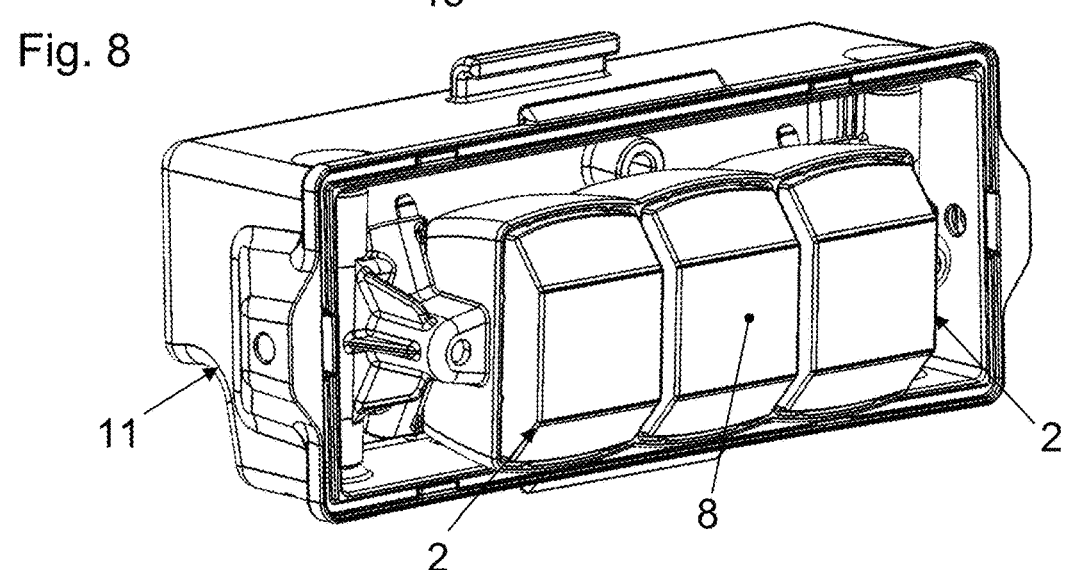
FIG. 8 shows a perspective view of the display device according to FIG. 4 with the housing without cover plate and without design panel.
Figure 9:
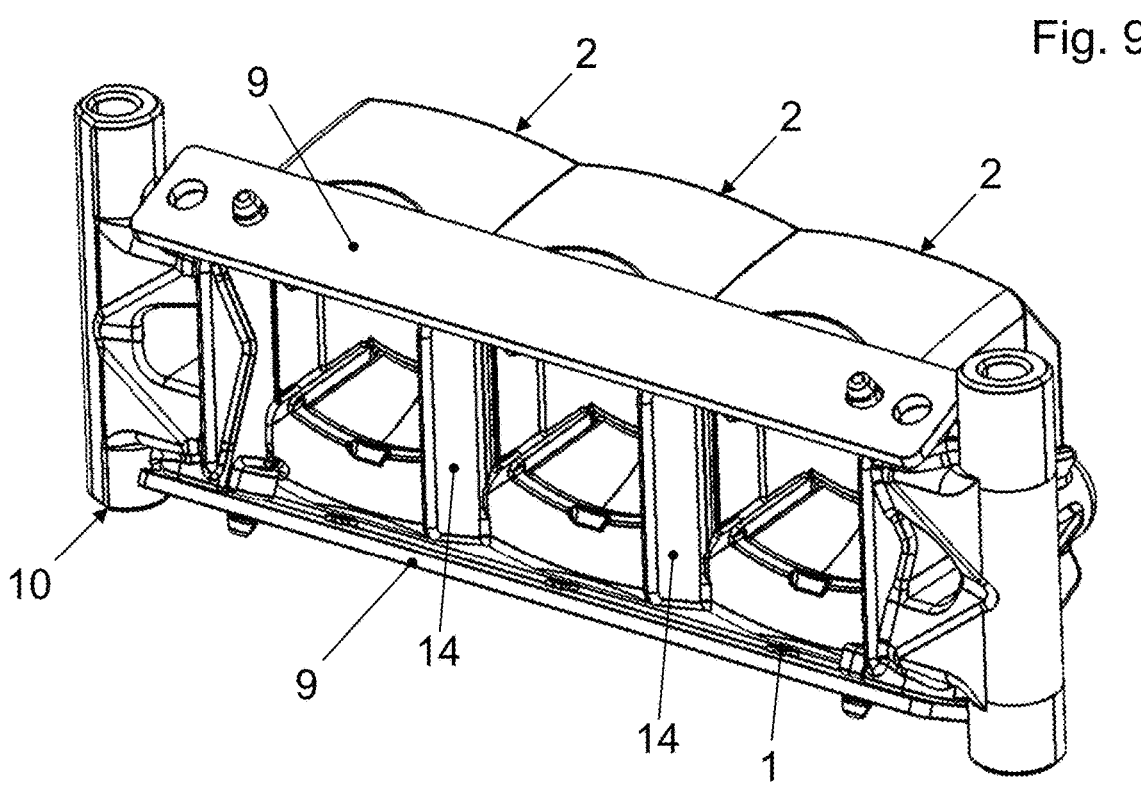
FIG. 9 shows a perspective view of the display device according to FIG. 4 with the holding device without housing.
Figure 10:
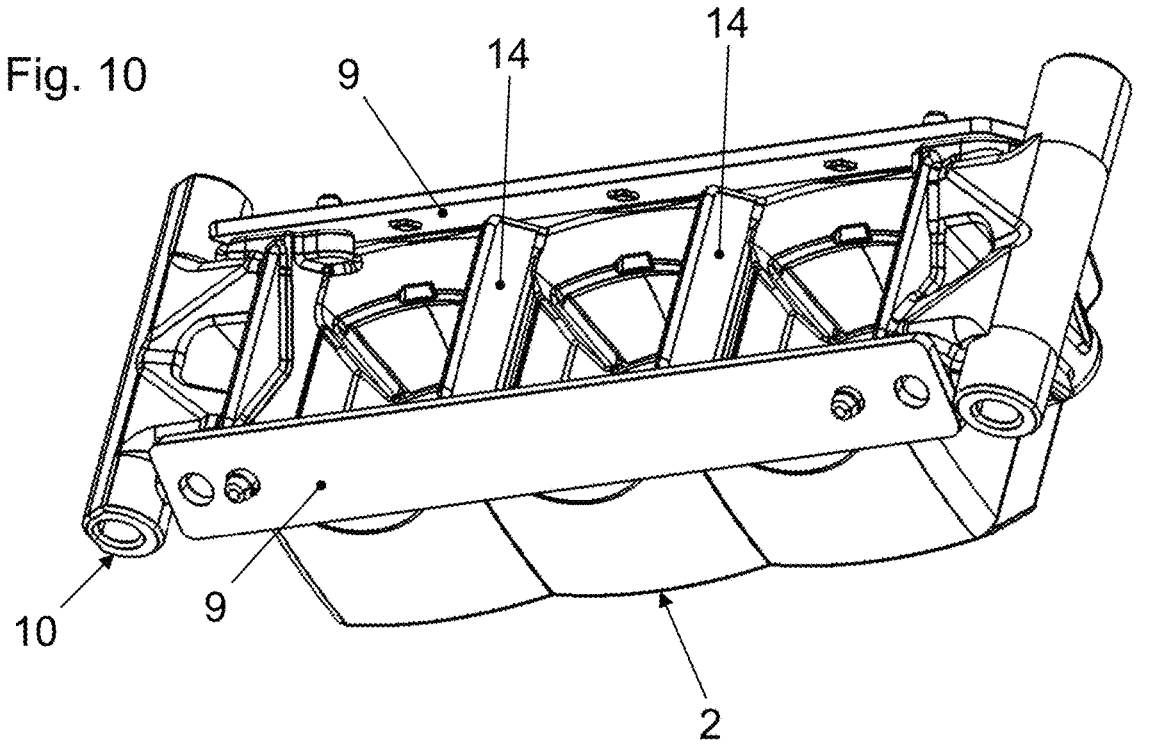
FIG. 10 shows a further perspective view of the display device according to FIG. 4 with the holding device without housing.
Figures 11, 12, 13:
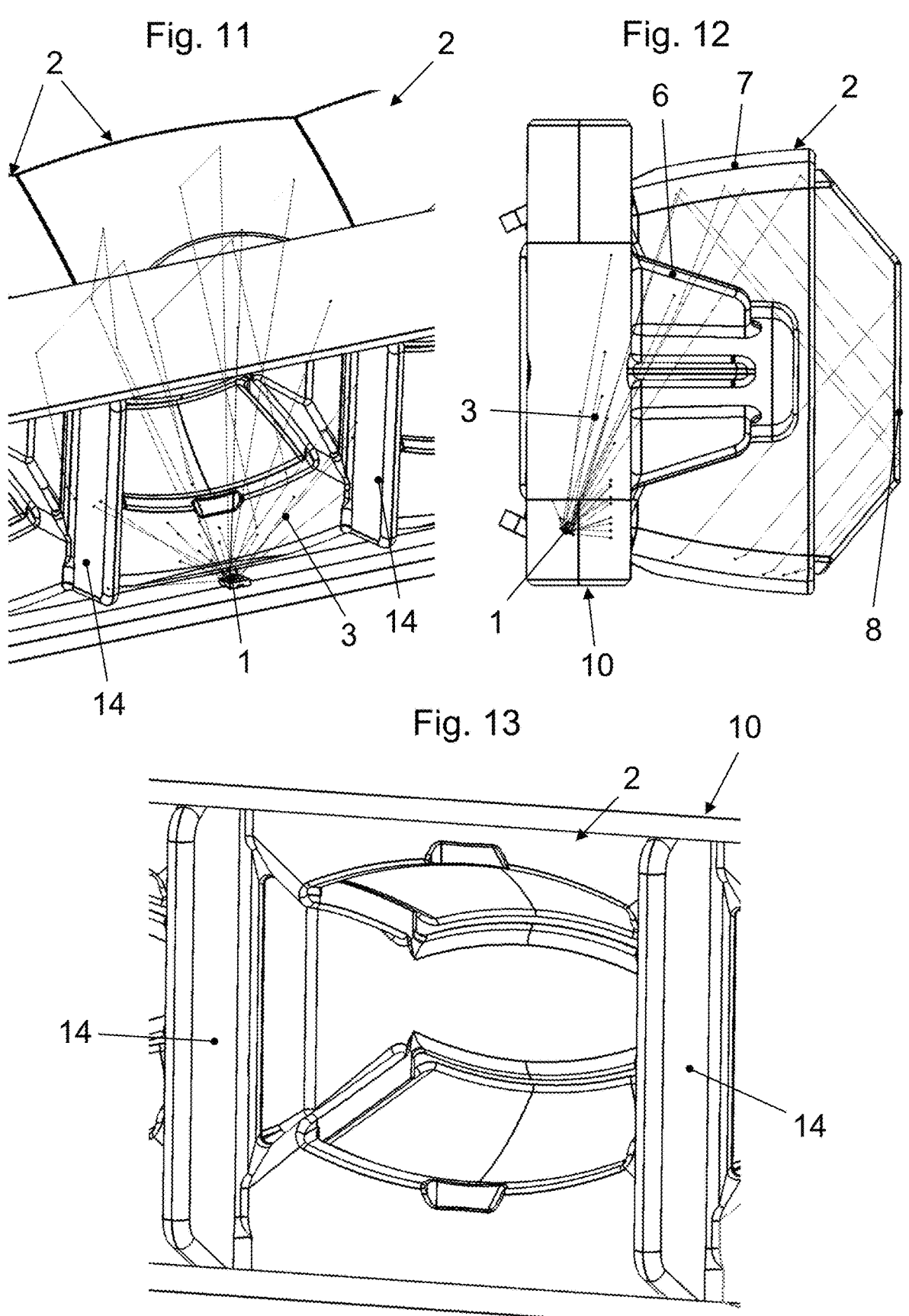
FIG. 11 shows a detail of a perspective view of the display device according to FIG. 4 with the holding device without housing, wherein an exemplary beam path of the light emanating from one of the light sources is depicted.
FIG. 12 shows a side view of the display device according to FIG. 4 with the holding device without housing, wherein an exemplary beam path of the light emanating from one of the light sources is depicted.
FIG. 13 shows a further detail of a perspective view of the display device according to FIG. 4 with the holding device without housing.

In the figures, identical and functionally equivalent parts are provided with the same reference numerals.

The part of the display device depicted in FIG. 1 to FIG. 3 comprises two light sources 1 and a light guide 2. Light sources 1 are configured in particular as light-emitting diodes (LEDs). Alternatively, the light sources 1 can also be designed as laser diodes.

Light guide 2 consists at least partially of a material that is transparent to light 3 of light sources 1. Light guide 2 is substantially U-shaped with two legs 4 and a connecting area 5 between the two legs. In this case, light guide 2 can be comparatively compact and, for example, have dimensions of between 20 mm and 40 mm in terms of width, height and depth, in particular a height in FIG. 3 of approximately 35 mm and a width and depth of approximately 25 mm.

Light guide 2 has two entrance surfaces 6 for light 3 of light sources 1. Here, one of entrance surfaces 6 is arranged on the inside of one of legs 4. In this case, light sources 1 are each arranged next to the end of one of legs 4 such that light 3 emanating from light source 1 enters entrance surface 6 of the other of legs 4 (see FIG. 3). In this way, light 3 travels a comparatively long distance from light source 1 to entrance surface 6, which enables a suitably large expansion of the light beam entering entrance surface 6.

The two entrance surfaces 6 are curved, in particular concavely curved. However, it is certainly possible that the entrance surfaces are formed to be convexly curved or flat.

Furthermore, light guide 2 has two reflective areas 7, which are formed on the outside of legs 4. Light 3, which has entered light guide 2 through entrance surfaces 6 is reflected by these reflective areas 7 into connecting area 5. In this case, the display device can be configured to the effect that light 3 strikes reflective area 7 at an angle relative to the normal that is greater than the critical angle of total reflection, so that light 3 is totally reflected if the surface of reflective area 7 is appropriately smooth. Alternatively or additionally, the surface of reflective area 7 can be mirror coated.

Connecting area 5 forms an exit surface on the side facing away from legs 4, onto which light 3 emanating from reflective areas 7 strikes and through which incident light 3 passes at least partially. The part of the display device depicted in FIG. 1 to FIG. 3 further comprises a hologram 8, which is applied, in particular glued, to the exit surface from the outside, in particular in the form of a volume hologram entered into a film. The image entered into hologram 8 can be reconstructed to realize a desired display function.

Hologram 8 is a transmission hologram with which the light passing through the exit surface can interact. If the angle of incidence between incident light 3 and the normal on the exit surface is sufficiently large, hologram 8 is also an edge-lit hologram because the illumination angle at which hologram 8 must be illuminated in order to reconstruct the holographic image then becomes comparatively large.

The comparatively large illumination angle makes it possible to avoid the zero order of the light utilized becoming disturbingly visible to an observer.

Reflective areas 7 are convexly curved and in particular formed as a paraboloid surface. This curvature ensures that the portions of light 3 incident on reflective areas 7 at different angles are reflected substantially in the same direction into connecting area 5. The light rays of light 3, which are substantially parallel to one another, ensure substantially the same illumination angles of hologram 8, which is advantageous for effective reconstruction of the holographic image.

Alternatively, it can be provided that reflective areas 7 are embodied as freeform surfaces in order to enable further optimization of the illumination or to enable optimal adaptation to coupled light 3 of light sources 1. Reflective areas 7 can alternatively be provided with additional optics depending on the desired light shaping of reflected light 3.

Due to the comparatively long distance that the light travels from light source 1 to reflective area 7, said distance can be comparatively completely illuminated, in particular in the direction extending into the plane of the drawing in FIG. 3, so that despite the compactness of light guide 2, the illumination of a comparatively wide hologram 8 is also possible.

It can be provided that two holograms 8 are arranged on light guide 2. These can both be applied, for example one above the other, to the outside of the exit surface of light guide 2. In particular, both holograms 8 can be entered into the same film. Holograms 8 can have been written with light of different wavelengths, so that they also have to be reconstructed with light of different wavelengths.

In this case, the two light sources 1 can have different wavelength distributions, in particular different colors. Light guide 2 can therefore be utilized for two different light colors, for example red and yellow or red and blue or red and green, in order to reconstruct two different images for each of the light colors by a hologram 8 in each case.

Alternatively, it is also possible to provide only one hologram 8 and only one light source 1, one entrance surface 6 and one reflective area 7. In this case, the height of the light guide can be reduced because an entire coupling and reflection area is not utilized.

In FIGS. 4 to 15 it can be clearly seen that the display device comprises a plurality of light guides 2, of which three light guides 2 arranged next to one another are depicted in FIGS. 4 to 15. In this case, the number of light guides 2 is chosen merely as an example. Of course, only two light guides 2 arranged next to one another can be provided. Alternatively, more than three light guides 2 arranged next to one another can be provided, too, for example four light guides 2 or five light guides 2 or more than five light guides 2.

Two light sources 1 are associated with each of three light guides 2, with three of light sources 1 in each case being arranged on a common circuit board 9 that extends in the direction in which light guides 2 are arranged next to one another. The light sources 1 associated with respective light guide 2 are arranged as illustrated in FIGS. 1 to 3.

At least one hologram 8 is provided per light guide 2 so that neighboring holographic images can be reconstructed by interaction with light 3 of the respective light sources 1.

The embodiment of a display device depicted in FIGS. 4 to 15 comprises a holding device 10 and a housing 11 that surrounds light guides 2 at the back and at the sides. A cover plate 12 and a design panel 13 are arranged on the front of the housing 11. Cover plate 12 covers the exit surfaces or holograms 8 of light guides 2. Design panel 13 surrounds the exit surfaces or holograms 8 of light guides 2 in order to attain an attractive form of the display device.

Depending on the installation situation of the display device in the vehicle, it is possible to dispense with cover plate 12 if, for example, a larger cover plate is provided at the installation site behind which the display device can be placed. Optionally, housing 11 can also be dispensed with if it is not necessary in a protected installation environment.

Holding device 10 has two light shading elements 14 on the back of light guides 2 or on the side of light guides 2 facing away from the exit surface. The two light shading elements 14 each originate from a connecting area between individual light guides 2 and extend from light guides 2 into the space between circuit boards 9. In this way, light shading elements 14 can at least partially prevent undesired light entry from a light source 1 into light guide 2 associated with an adjacent light source 1 (see in particular FIG. 11). This can in particular reduce the occurrence of double images or blurring in adjacent holographic images.

Figures 14, 15:
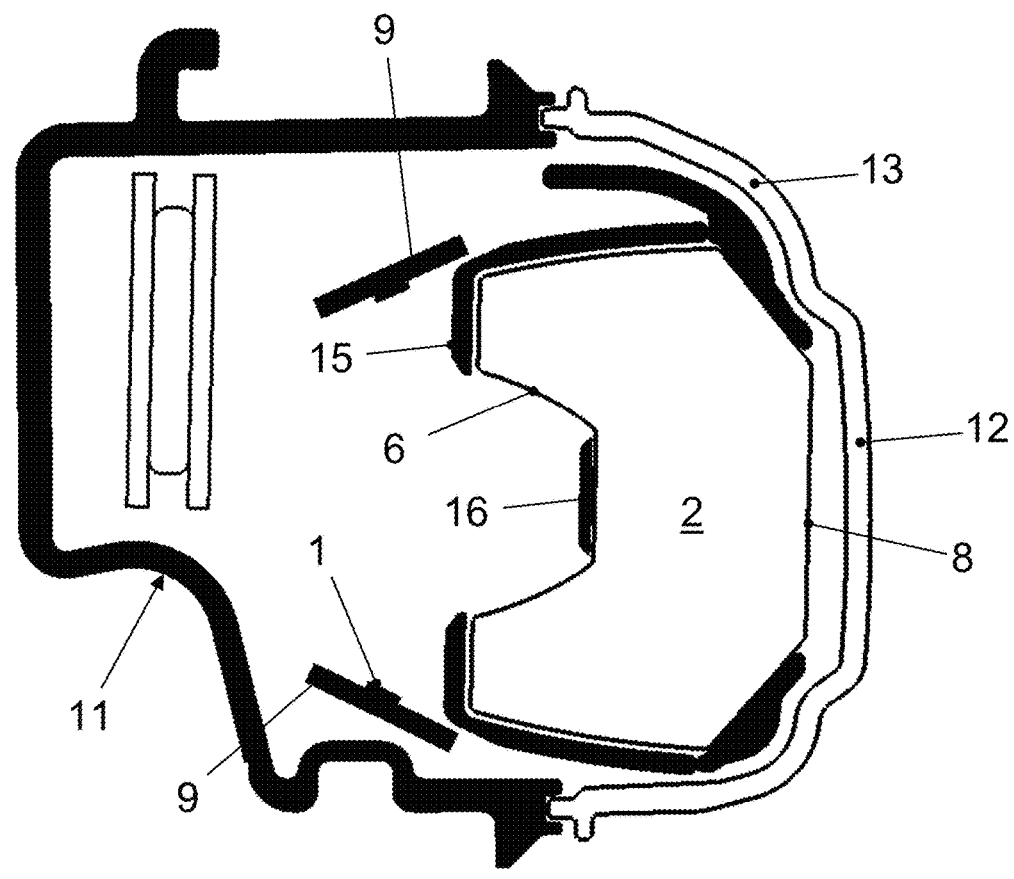
FIG. 14 shows a vertical section through the display device according to FIG. 4.
FIG. 15 shows a horizontal section through the display device according to FIG. 4.

Holding device 10 comprises further light shading elements 15, 16 which cover parts of light guides 2 in order to largely prevent undesired light entry from one of the light sources into light guides 2 (see in particular FIG. 14).

The display device can, for example, fulfill a warning and indicator function. For this purpose, the display device can control the plurality of light sources 1 such that the individual holographic images reconstructed by the interaction of light 3 with holograms 8 arranged at or in individual light guides 2 are generated at different times, in particular in order to generate a dynamic or animated composite image. For example, when activating and/or deactivating the display function, the plurality of light sources 1 can be controlled sequentially, thereby introducing a dynamic or animation into the holographic display, which increases attention and further increases safety. For example, this can also provide a warning for the driver in a hazard gradation.

Figure 16:
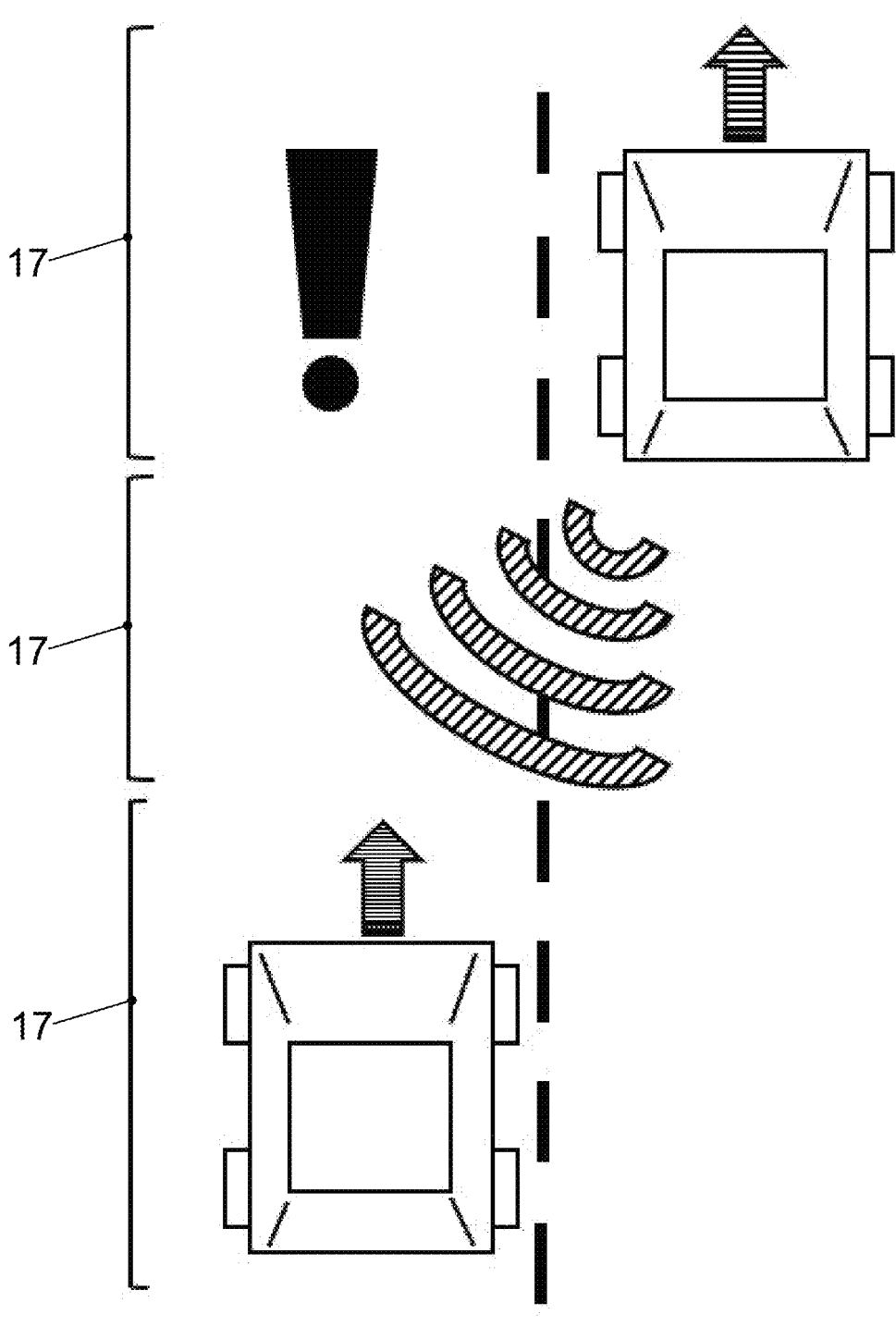
FIG. 16 shows a first embodiment of an image generated by a display device according to the disclosure.

FIG. 16 shows the display of a display device, which is composed of three holographic images 17. The display device can be part of a blind spot assistant and can indicate a vehicle in a blind spot using animation.

Figure 17:
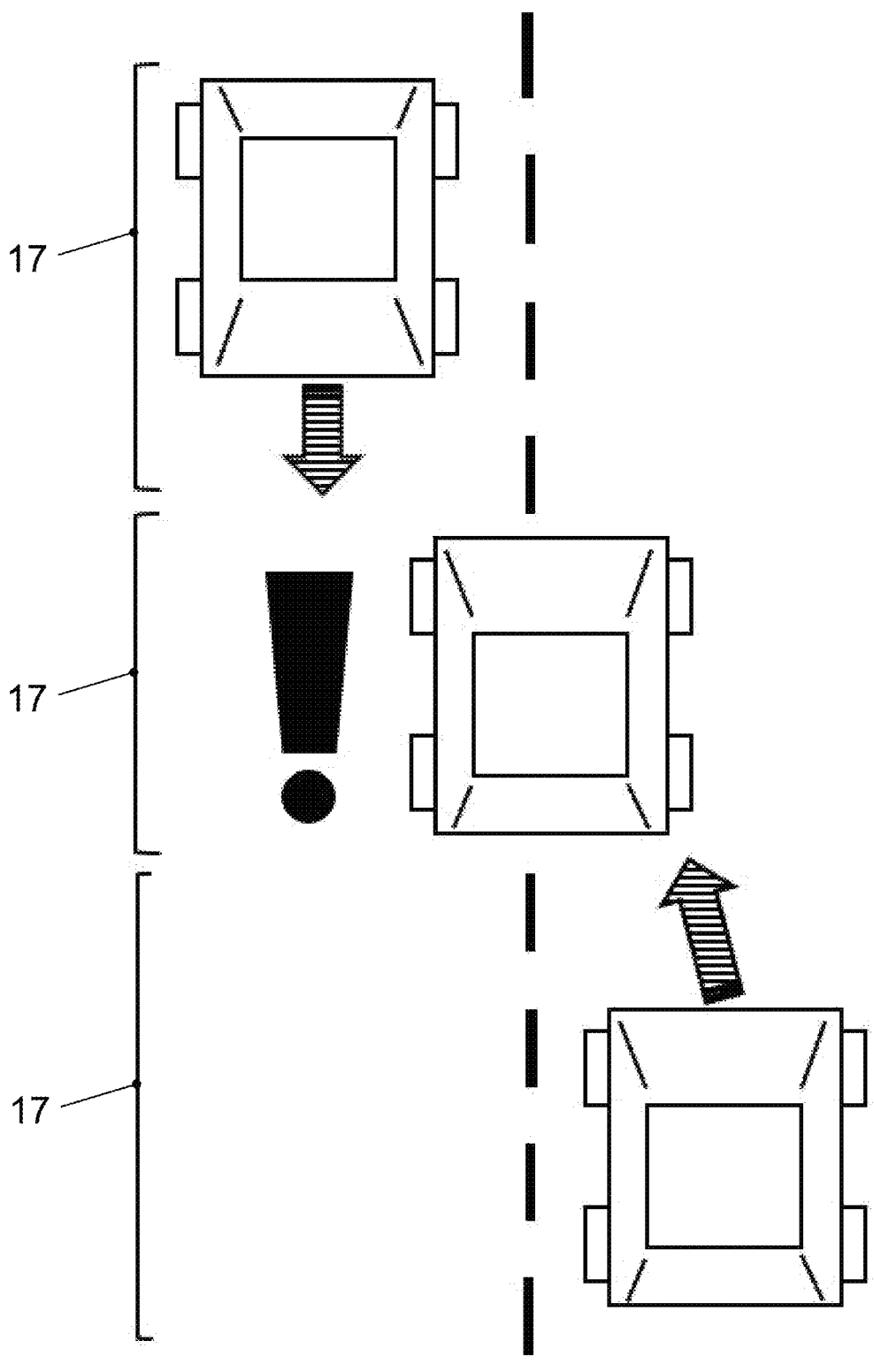
FIG. 17 shows a second embodiment of an image generated by a display device according to the disclosure.

FIG. 17 shows the display of a display device which is also composed of three holographic images 17. The display device can be part of a lane change assistant and can use animation to indicate an oncoming vehicle preventing the lane change.

As image 17, any pictograms, texts or other content of any kind can be stored in the at least one hologram 8.

Images 17 generated can be animated in both directions—from top to bottom or vice versa, or from left to right or vice versa. In addition, the brightness of the individual objects in holographic image 17 or of the individual sections of the image can be varied; for example, the brightness can be varied from low to bright for a graduated warning effect.

Depending on the installation site in the vehicle, the viewing angle range for the holographic function can be defined differently. For example, if a blind spot warning system and lane change assistant are provided as functional elements in the A-pillar, the viewing area of the left, driver-side hologram function and the other viewing area for the right, passenger-side hologram function can be embodied to be restricted to the driver's position. By using a hologram, the eye box or the viewing angle range can be embodied to be limited to the driver only, so that a high luminance or brightness in the holographic system can be attained even with little light.

Notwithstanding the above, any desired eye box can be defined and embodied for other installation situations, either for a specific seat in the vehicle or for several seats.

What is claimed is:

1. A display device for an interior of a vehicle, comprising:
   a plurality of light sources;
   a plurality of light guides, each having an entrance surface and a reflective area, wherein the light guides are arranged next to one another, wherein each light source of the plurality of light sources emanates light that enters the entrance surface of an associated light guide of the plurality of light guides; and
   a plurality of holograms, wherein a hologram of the plurality of holograms is arranged at or in each light guide of the plurality of light guides,
   wherein the light emanated by each light source enters the entrance surface of the associated light guide in a direction of the reflective area of the associated light guide, is reflected by the reflective area of the associated light guide in a direction of the hologram of the associated light guide, and interacts with the hologram of the associated light guide, and
   wherein an average distance between each light source and the reflective area of the associated light guide is at least half an average distance between the reflective area and the hologram of the associated light guide, and wherein an average distance between each light source and the entrance surface of the associated light guide together with an average distance between the entrance surface and the reflective area of the associated light guide is between 0.8 and 1.2 times the average distance between the reflective area and the hologram of the associated light guide.

2. The display device of claim 1, wherein the average distance between the entrance surface and the reflective area of the associated light guide is at least half the average distance from the reflective area to the hologram of the associated light guide, and/or the average distance between each light source and the entrance surface of the associated light guide is at least half the average distance between the reflective area and the hologram of the associated light guide.

3. The display device of claim 1, wherein an image comprising a plurality of individual holographic images results from an interaction of light with the plurality of holograms arranged at or in the plurality of light guides.

4. The display device of claim 3, wherein the display device is configured to control the plurality of light sources such that the individual holographic images generated by the interaction of the light with the plurality of holograms arranged at or in the plurality of light guides are generated at different times to generate a dynamic or animated composite image.

5. The display device of claim 1, further comprising:
a holding device at or in which the plurality of light sources and the plurality of light guides with the plurality of holograms are held.

6. The display device of claim 5, wherein the holding device comprises at least one light shading element to at least partially prevent undesired light entry into the plurality of light guides, the at least one light shading element being arranged in a connecting area between individual ones of the plurality of light guides and/or extending from a connecting area between individual ones of the plurality of light guides.

7. The display device of claim 1, further comprising at least one of: a housing, a cover plate, and a design panel.

8. The display device of claim 1, wherein the display device is configured to be integrated in an A-pillar, in a B-pillar, in a C-pillar, in a dashboard, in a center console, in a roof console, or in a door of the interior of the vehicle.

9. A display device for an interior of a vehicle, comprising:
a plurality of light sources;
a plurality of light guides, each having an entrance surface and a reflective area, wherein the light guides are arranged next to one another, wherein each light source of the plurality of light sources emanates light that enters the entrance surface of an associated light guide of the plurality of light guides; and
a plurality of holograms, wherein a hologram of the plurality of holograms is arranged at or in each light guide of the plurality of light guides, wherein:
the light emanated by each light source enters the entrance surface of the associated light guide in a direction of the reflective area of the associated light guide, is reflected by the reflective area of the associated light guide in a direction of the hologram of the associated light guide, and interacts with the hologram of the associated light guide;

first and second light sources of the plurality of light sources are associated with a first light guide of the plurality of light guides;
the first light guide has first and second entrance surfaces and first and second reflective areas;
light emanating from the first light source enters the first entrance surface of the first light guide in a direction of the first reflective area, is reflected by the first reflective area in a direction of the hologram of the first light guide, and interacts with the hologram of the first light guide; and
light emanating from the second light source enters the second entrance surface of the first light guide in a direction of the second reflective area, is reflected by the second reflective area in a direction of the hologram of the first light guide, and interacts with the hologram of the first light guide.

10. The display device of claim 9, wherein:
first and second holograms of the plurality of holograms are arranged on the first light guide;
the first hologram interacts with the light emanating from the first light source; and
the second hologram interacts with the light emanating from the second light source.

11. The display device of claim 9, wherein the light emanating from the first light source has a different wavelength distribution than the light emanating from the second light source.

12. The display device of claim 9, wherein each of the plurality of light guides is U-shaped with first and second legs and a connecting area between the first and second legs.

13. The display device of claim 12, wherein:
the first entrance surface and the first reflective area are arranged on the first leg;
the second entrance surface and the second reflective area are arranged on the second leg; and
the hologram is arranged at or in the connecting area.

14. The display device of claim 13, wherein:
the first light source is arranged at or in an area of the second leg; and
the second light source is arranged at or in an area of the first leg.

* * * * *